United States Patent
Du

(10) Patent No.: US 11,817,995 B2
(45) Date of Patent: Nov. 14, 2023

(54) METHOD FOR WEAKENING DELAYS RESULTED FROM FAILURES OF MULTIPLE CONTINUOUS NODES IN DBFT, COMPUTER READABLE STORAGE MEDIUM AND DBFT DISTRIBUTED NETWORK

(71) Applicant: Xiaonan Du, Beijing (CN)

(72) Inventor: Xiaonan Du, Beijing (CN)

( * ) Notice: Subject to any disclaimer, the term of this patent is extended or adjusted under 35 U.S.C. 154(b) by 373 days.

(21) Appl. No.: 17/296,976

(22) PCT Filed: Jan. 21, 2021

(86) PCT No.: PCT/CN2021/073097
§ 371 (c)(1),
(2) Date: May 26, 2021

(87) PCT Pub. No.: WO2021/175035
PCT Pub. Date: Sep. 10, 2021

(65) Prior Publication Data
US 2022/0123990 A1    Apr. 21, 2022

(30) Foreign Application Priority Data
Mar. 6, 2020   (CN) .......................... 202010152020.6

(51) Int. Cl.
*H04L 41/0668* (2022.01)
*H04L 9/06* (2006.01)
*H04L 41/0659* (2022.01)
*H04L 9/00* (2022.01)

(52) U.S. Cl.
CPC ........ *H04L 41/0668* (2013.01); *H04L 9/0643* (2013.01); *H04L 41/0661* (2023.05); *H04L 9/50* (2022.05)

(58) Field of Classification Search
CPC .............. H04L 41/0668; H04L 9/0643; H04L 41/0661; H04L 9/50; H04L 9/3239; H04L 67/10; G06F 16/2255; G06F 16/2272; G06F 16/27
See application file for complete search history.

(56) References Cited

U.S. PATENT DOCUMENTS

| | | | | |
|---|---|---|---|---|
| 6,671,821 B1* | 12/2003 | Castro | ................. | G06F 11/1482 714/21 |
| 2019/0286531 A1* | 9/2019 | Lin | ...................... | G06F 11/1469 |
| 2019/0294514 A1* | 9/2019 | Tang | ................... | G06F 11/2041 |

* cited by examiner

*Primary Examiner* — Rina C Pancholi

(57) ABSTRACT

A method for weakening delays resulted from failures of multiple continuous nodes in a DBFT distributed network is provided. In step S1, whether a view index is equal to zero is determined, if yes, a new Leader index is obtained according to a first rule and the method processes to step S3, otherwise processes to step S2. In step S2, the new Leader index is obtained according to a second rule, and whether a proposal proposed by a node corresponding to the new Leader index is passed is determined. If yes, the method processes to step S3, otherwise, step S2 is implemented repeatedly until the proposal proposed by the node corresponding to the new Leader index is passed. In step S3, the node corresponding to the new Leader index is taken as a new Leader. Then the delays caused by multiple continuous nodes in the DBFT distributed network are weaken.

9 Claims, 3 Drawing Sheets

METHOD FOR WEAKENING DELAYS RESULTED FROM FAILURES OF MULTIPLE CONTINUOUS NODES IN DBFT, COMPUTER READABLE STORAGE MEDIUM AND DBFT DISTRIBUTED NETWORK

TECHNICAL FIELD

The present disclosure relates generally to a distributed network field, and more particularly relates to a method for weakening delays resulted from failures of multiple continuous nodes in a DBFT distributed network, a computer readable storage medium and a DBFT distributed network.

BACKGROUND

DBFT (Delegated *Byzantine* Fault Tolerance) is a common consensus mechanism module, which has proposed an improved *Byzantine* fault tolerance algorithm capable of applying to a Blockchain system. This consensus mechanism is based on the practical *Byzantine* Fault Tolerance algorithm proposed by Castro and Liskov, and can be applied to the Blockchain system after the improvement. *Byzantine* Fault Tolerance technology is widely used in the distributed systems, such as the distributed file system, distributed collaboration system, cloud computation, and so on. DBFT has mainly made the following improvements: 1), the request-response mode of the C/S architecture is improved to the peer-to-peer mode suitable for the P2P network; 2), the static consensus participation nodes are improved to be the dynamic consensus participation nodes which can enter and exit dynamically; 3) a voting mechanism based on the proportions of the owned equities is designed for the generation of the consensus participation nodes, in which the consensus participation nodes (accounting nodes) are determined by the votes; 4), the digital certificate is introduced into the Blockchain to solve the authentication problem of the real identity of the accounting node in the voting process.

In the Normal situation, as shown in FIG. 1, the DBFT nodes follow the algorithm of selecting leaders in turns, that is, p=(h+v) % n, wherein h refers to the block height, n refers to the node number, v refers to the view index, p refers to the index of the Leader in the consensus nodes. Accordingly, in the Normal situation, when v=0, the proposal of the Leader can pass just by voting for once at the height h. However, if the elected Leader of the DBFT fails and such failure is not solved in the schedule time t, then the view index of the DBFT should be v++, and a new Leader should be elected according to the formula p=(h+v) % n. The newly elected Leader is a node having an index of p+1. In this situation, if there is just one node fails, the block generation delay resulted from the single node failure of the whole network should be t. However, if there are m continuous nodes fail, the block generation delay resulted from the failures of multiple continuous nodes of the whole network should be m*t. Accordingly, the block generation speed of the DBFT distributed network will be greatly reduced when there are multiple continuous nodes fail.

SUMMARY

The object of the present disclosure is to provide a method for weakening delays resulted from failures of multiple continuous nodes in a DBFT distributed network, which weakens the delays resulted from failures of multiple continuous nodes in the DBFT distributed network by changing the selection method of the Leader in case of failure, thus accelerating the block generation time of the DBFT distributed network, aiming at the technical problems mentioned in the above prior arts.

In a first aspect, a method for weakening delays resulted from failures of multiple continuous nodes in a DBFT distributed network is provided, which comprises following steps:

S1. determining that whether a view index is equal to zero; if yes, obtaining a new Leader index according to a first rule and implementing step S3, otherwise implementing step S2;

S2. calculating the new Leader index according to a second rule and determining whether a proposal proposed by a node corresponding to the new Leader index is passed; if yes, implementing step S3, otherwise repeatedly implementing step S2 until the proposal proposed by the node corresponding to the new Leader index is passed;

S3. taking the node corresponding to the new Leader index as a new Leader.

Preferably, in the step S1, the first rule is as follows: $p_h=(p_{h-1}+1) \% n$, wherein n refers to a node number, $p_h$ refers to the new Leader index, $p_{h-1}$ refers to a last Leader index.

Preferably, the step S2 further comprises following steps:

S21. implementing a v++ operation for the view index v;

S21. converting a block height h and the view index v into a binary stream, respectively, and then merging the binary streams for obtaining a merged binary stream $b_{hv}=(b_h+b_v)$, in which $b_h$ refers to a binary stream of the block height h, while $b_v$ refers to a binary stream of the view index v;

S23. Hashing the merged binary stream $b_{hv}$ and obtaining a merged binary stream Hash value;

S24. removing last eight bits of the merged binary stream Hash value, and performing a modular operation on the block height h to obtain the new Leader index;

S25. determining that whether the proposal proposed by the node corresponding to the new Leader index is passed; if yes, implementing step S3, otherwise returning to step S21.

Preferably, in the step S23, Hashing the merged binary stream $b_{hv}$ through a blake2b algorithm to obtain the merged binary stream Hash value as $hash_{hv}=blake2b(b_{hv})$.

Preferably, in step S1, when the view index v=0, the new leader index is equal to the last leader index plus 1.

According to a second aspect, a computer readable storage medium is provided, having stored thereon, a computer program executable by a processor for causing the processor to perform above steps mentioned in the above method for weakening delays resulted from failures of multiple continuous nodes in a DBFT distributed network.

According to a third aspect, a DBFT distributed network comprising multiple DBFT nodes is provided, wherein the DBFT nodes have stored thereon, a computer program executable by the DBFT nodes for causing the DBFT nodes to perform above steps mentioned in the above method for weakening delays resulted from failures of multiple continuous nodes in a DBFT distributed network.

By implementing the a method for weakening delays resulted from failures of multiple continuous nodes in a DBFT distributed network, a computer readable storage medium and a DBFT distributed network discussed above, when the view index is equal to zero, the last leader index is directly added by 1 and then used as the new Leader index, while when the view index is not equal to zero, the new Leader index is calculated by the merged Hash value of the block height and view index. Thus, the delay time superposition of the block generation resulted from failures of multiple continuous nodes is avoided, and the delays caused by multiple continuous nodes in the DBFT distributed network are weakened.

BRIEF DESCRIPTION OF THE DRAWINGS

The present disclosure will be further described in combination with the drawings and the embodiments

DETAILED DESCRIPTION OF THE PREFERRED EMBODIMENT

In order to make the purpose, technical scheme and advantages of the present disclosure clearer and more obvious, the present disclosure is further described in detail in combination with the attached drawings and embodiments. It should be understood that the specific embodiments described herein are intended to explain the present disclosure only and are not intended to limit the present disclosure.

In the present disclosure, when the view index is equal to zero, the last Leader index is directly added by 1 and then used as the new Leader index, while when the view index is not equal to zero, the new Leader index is calculated by the merged Hash value of the block height and view index, thus avoiding that the block generation delay should be waited repeatedly at each faulted node, and that the delay time should be superimposed by the failures of multiple continuous nodes, such that the delays caused by multiple continuous nodes in the DBFT distributed network are weakened.

Figure 1:
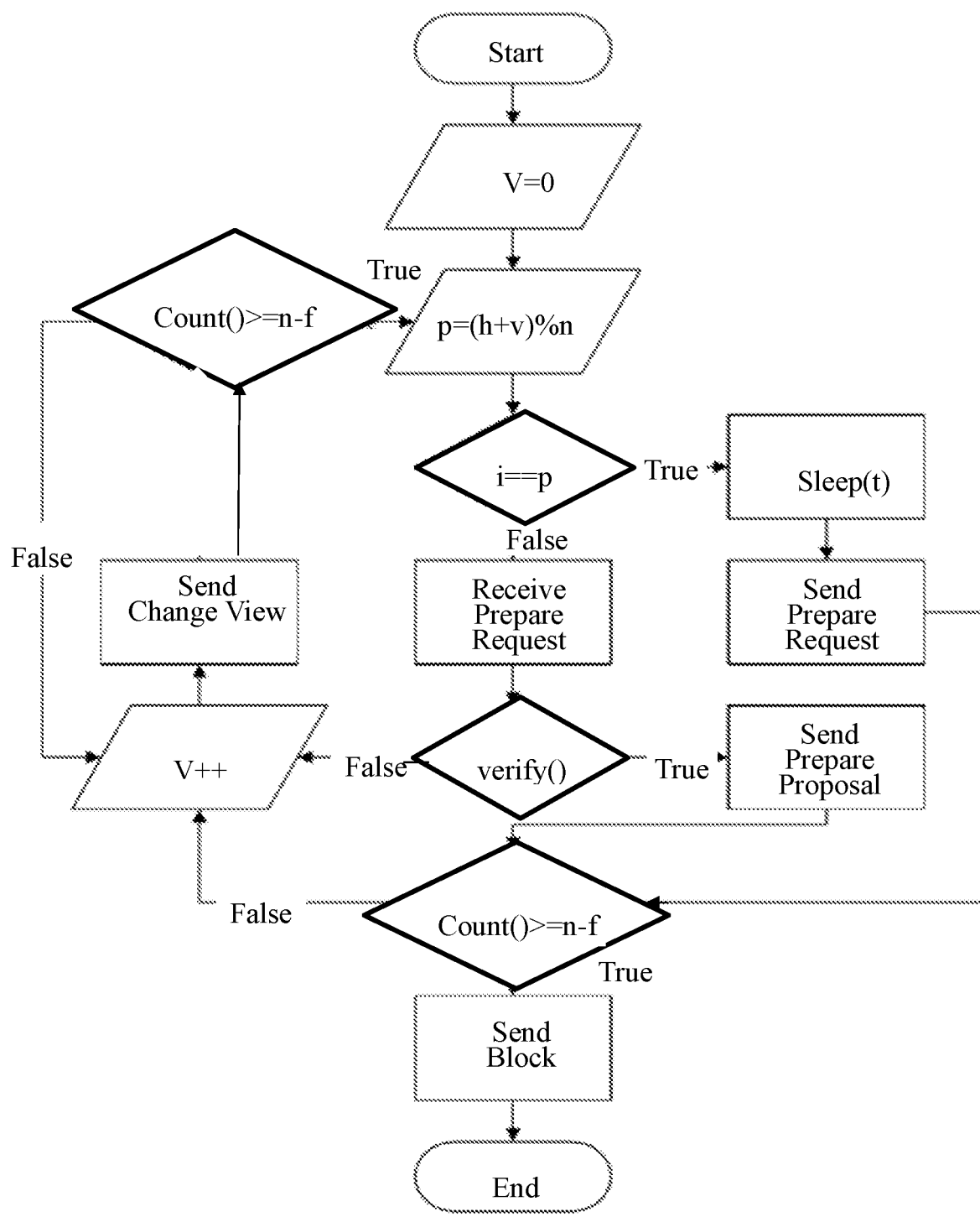
FIG. 1 is an operation flow chart of the DBFT nodes of the prior art.
Figure 2:
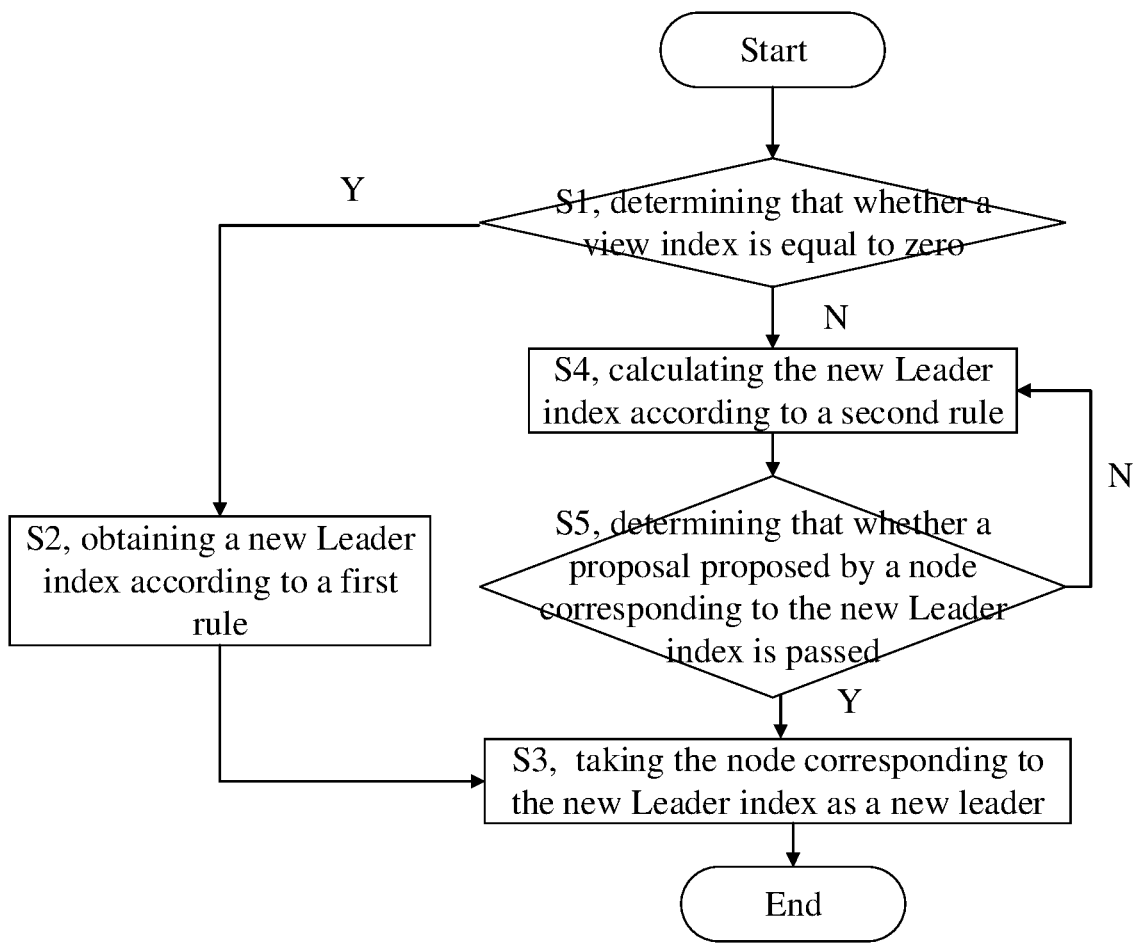
FIG. 2 is a flow diagram of the method for weakening delays resulted from failures of multiple continuous nodes in a DBFT distributed network according to a first preferable embodiment of the present disclosure.

FIG. 2 is a flow diagram of the method for weakening delays resulted from failures of multiple continuous nodes in a DBFT distributed network according to a first preferable embodiment of the present disclosure. As shown in FIG. 2, the method for weakening delays resulted from failures of multiple continuous nodes in a DBFT distributed network comprises following steps. In step S1, whether a view index is equal to zero is determined, if yes, process to step S2, or else, process to step S4. In step S2, the new Leader index is obtained according to a first rule. Then the step S3 is implemented sequentially. In a preferable embodiment of the present disclosure, in the step S2, the first rule is as follows: $p_h=(p_{h-1}+1)\ \%\ n$, wherein n refers to a node number, $p_h$ refers to the new Leader index, $p_{h-1}$ refers to a last Leader index. That is to say, as long as the view index is equal to zero, the new leader index is equal to the last leader index plus 1. When the view index changes, that is, not equal to zero, the step S4 is implemented to calculate the new leader index.

In step S4, the new Leader index is calculated according to a second rule. In a preferable embodiment of the present disclosure, the step of calculating the new Leader index according to a second rule is as follows.

(1). A v++ operation is implemented for the view index v.

(2). A block height h and the view index v is converted into a binary stream, respectively, and then the binary streams of the block height h and the view index v are merged for obtaining a merged binary stream $b_{hv}=(b_h+b_v)$, in which $b_h$ refers to a binary stream of the block height h, while $b_v$ refers to a binary stream of the view index v.

(3). Hash the merged binary stream $b_{hv}$ for obtaining a merged binary stream Hash value. In a preferable embodiment of the present disclosure, Hash the merged binary stream $b_{hv}$ through a blake2b algorithm to obtain the merged binary stream Hash value as $hash_{hv}=blake2b(b_{hv})$.

(4). The last eight bits of the merged binary stream Hash value are removed, and then a modular operation is performed on the block height h to obtain the new Leader index.

In the present embodiment, after the step S4 of calculating the new Leader index according to a second rule has been implemented, the step S5 can be implemented sequentially, in which whether the proposal proposed by the node corresponding to the new Leader index is passed, is determined. If yes, the step S3 is implemented, in which the node corresponding to the new Leader index is taken as the new Leader. Then the next proposal will be proposed by the new Leader. If the proposal proposed by the node corresponding to the new Leader index is not passed, the node corresponding to the new Leader index is not confirmed as the new Leader. Then the process returns to step S4, and the steps (4)-(5) are implemented again until the proposal proposed by the node corresponding to the new Leader index is passed.

By implementing the a method for weakening delays resulted from failures of multiple continuous nodes in a DBFT distributed network, a computer readable storage medium and a DBFT distributed network discussed above, when the view index is equal to zero, the last Leader index is directly added by 1 and then used as the new Leader index, while when the view index is not equal to zero, the new Leader index is calculated by the merged Hash value of the block height and view index. Thus, the delay time superposition of the block generation resulted from failures of multiple continuous nodes is avoided, and the delays caused by multiple continuous nodes in the DBFT distributed network are weakened.

Figure 3:
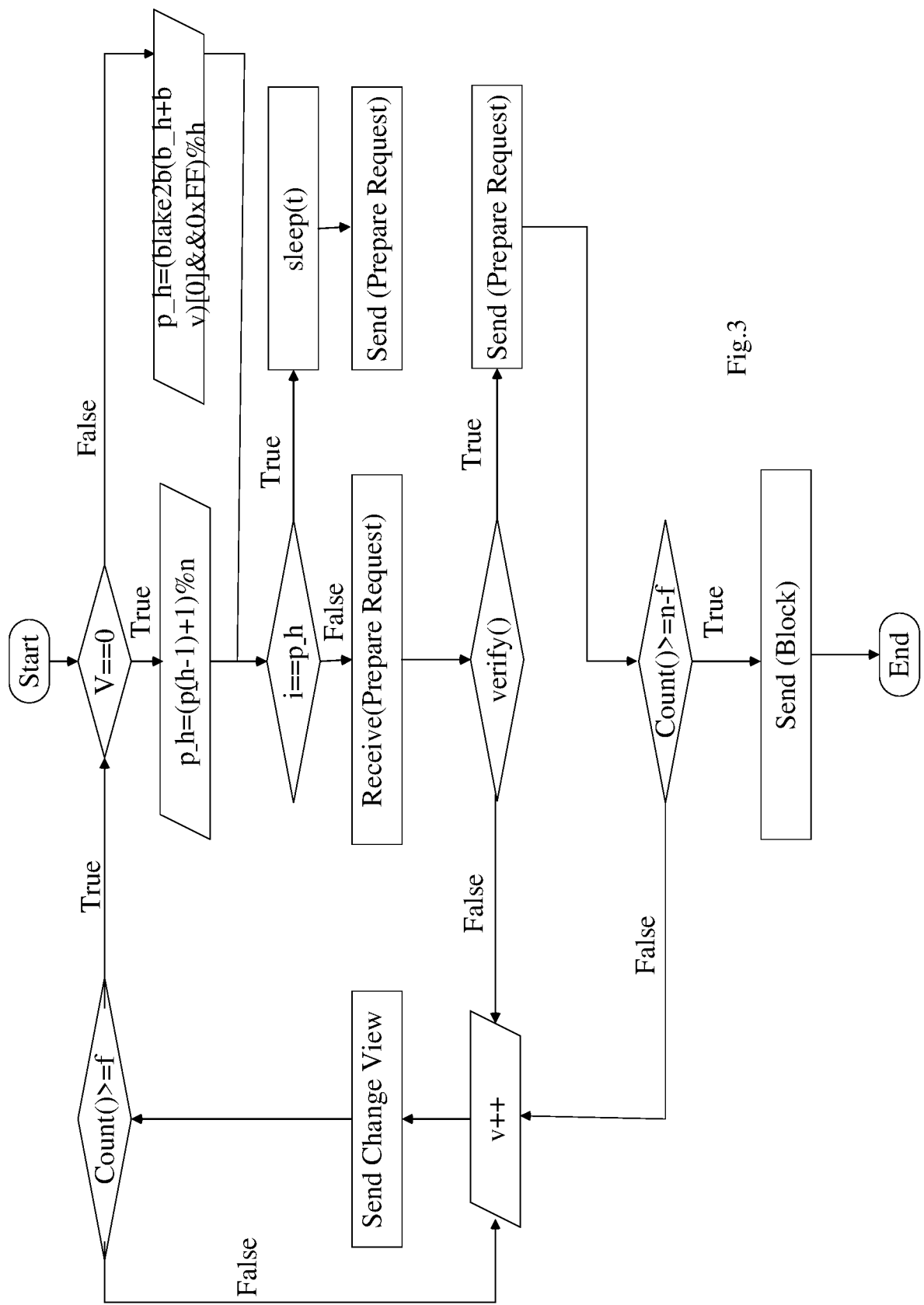
FIG. 3 is an operation flow chart of the DBFT nodes of the DBFT distributed network according to the present disclosure.

FIG. 3 is an operation flow chart of the DBFT nodes of the DBFT distributed network according to the present disclosure. The specific embodiment of the method for weakening delays resulted from failures of multiple continuous nodes in a DBFT distributed network of the present disclosure is further explained as follows.

As shown in FIG. 3, when the view index v=0, the Leader election of the DBFT distributed network never follows $p=(h+v)\ \%\ n$, but instead follows $p_h=(p_{h-1}+1)\ \%\ n$. As stated before, n refers to a node number, $p_h$ refers to the new Leader index, $p_{h-1}$ refers to a last Leader index. That is to say, as long as the view index is equal to zero, the Leader index of the current period is equal to the last Leader index plus 1.

When the view index changes, that is, not equal to zero, the Leader election of the DBFT distributed network never follows $p_h=(p_{h-1}+1)\ \%\ n$, but instead follows following rules.

(1). A v++ operation is implemented for the view index v.

(2). A block height h and the view index v is converted into a binary stream, respectively, and then the binary streams of the block height h and the view index v are merged for obtaining a merged binary stream $b_{hv}=(b_h+b_v)$, in which $b_h$ refers to a binary stream of the block height h, while $b_v$ refers to a binary stream of the view index v.

(3). Hash the merged binary stream $b_{hv}$ for obtaining a merged binary stream Hash value. In a preferable embodiment of the present disclosure, Hash the merged binary stream $b_{hv}$ through a blake2b algorithm to obtain the merged binary stream Hash value as $hash_{hv}$=blake2b($b_{hv}$).

(4). The last eight bits of the merged binary stream Hash value are removed, and then a modular operation is performed on the block height h by the obtained merged binary stream Hash value to obtain the new Leader index $p_h$=(($hash_{hv}$[0])&ff) % h.

(5). When the proposal proposed by the node corresponding to the new Leader index $p_h$ is passed, then the following proposal will be proposed by the node corresponding to the further new Leader $p_{h+1}$=($p_h$+1) % n.

(6). When the proposal proposed by the node corresponding to the new Leader index $p_h$ is not passed, then the steps (1)-(4) would be implemented repeatedly until the proposal proposed by the node corresponding to the new Leader index $p_h$ is finally passed.

The present disclosure further relates to a computer readable storage medium having stored thereon, a computer program executable by a processor for causing the processor to perform above steps mentioned in the above method for weakening delays resulted from failures of multiple continuous nodes in a DBFT distributed network.

The present disclosure further relates to a DBFT distributed network comprising multiple DBFT nodes, wherein the DBFT nodes have stored thereon, a computer program executable by the DBFT nodes for causing the DBFT nodes to perform above steps mentioned in the above method for weakening delays resulted from failures of multiple continuous nodes in a DBFT distributed network.

By implementing the a method for weakening delays resulted from failures of multiple continuous nodes in a DBFT distributed network, a computer readable storage medium and a DBFT distributed network discussed above, when the view index is equal to zero, the last Leader index is directly added by 1 and then used as the new Leader index, while when the view index is not equal to zero, the new Leader index is calculated by the merged Hash value of the block height and view index. Thus, the delay time superposition of the block generation resulted from failures of multiple continuous nodes is avoided, and the delays caused by multiple continuous nodes in the DBFT distributed network are weakened.

Therefore, the application can be realized by hardware, software or combination of software and hardware. The present disclosure may be implemented in a centralized manner in at least one computer system or in a decentralized manner by different parts distributed in several interconnected computer systems. Any computer system or other equipment that can realize the method of the application is applicable. The combination of commonly used software and hardware can be a general-purpose computer system installed with computer programs, and the computer system can be controlled by installing and implementing programs to make it run according to the method of the application.

The application can also be implemented through a computer program product, the program contains all the features that can realize the method of the application, and the method of the application can be realized when it is installed in a computer system. The computer program in this document refers to any expression of a set of instructions that can be written in any programming language, code or symbol. The instruction group enables the system to process information to directly realize a specific function, or after one or two of the following steps: a) convert to other languages, codes or symbols; b) reproduce in different formats.

Although the present disclosure is illustrated by specific embodiments, those skilled in the art should understand that various transformations and equivalent substitutions can be made to the disclosure without departing from the scope of the present disclosure. In addition, various modifications can be made to the present disclosure for specific situations or materials without departing from the scope of the disclosure. Therefore, the disclosure is not limited to the specific embodiments disclosed, but should include all the embodiments falling within the scope of the claims of the disclosure.

The above disclosure is just preferable embodiments and does not limit the present disclosure. Any modification, equivalent replacement and improvement made within the spirit and principle of the present disclosure shall be included in the protection scope of the present disclosure.

The invention claimed is:

1. A method for weakening delays resulted from failures of multiple continuous nodes in a DBFT distributed network, comprising following steps:
   S1. determining that whether a view index is equal to zero; if yes, obtaining a new Leader index corresponding to a node according to a first rule and implementing step S3, otherwise implementing step S2;
   S2. calculating the new Leader index according to a second rule and determining whether a proposal proposed by the node corresponding to the new Leader index is passed; if yes, implementing step S3, otherwise repeatedly implementing step S2 until the proposal proposed by the node corresponding to the new Leader index is passed;
   S3. taking the node corresponding to the new Leader index as a new leader;
   wherein in the step S1, the first rule is as follows: $p_h$=($p_{h-1}$+1)% n, wherein n refers to a node number, $p_h$ refers to the new Leader index, $p_{h-1}$ refers to a last Leader index;
   wherein the step S2 further comprises following steps:
   S21. implementing a v++ operation for the view index v;
   S22. converting a block height h and the view index v into a binary stream, respectively, and then merging the binary streams for obtaining a merged binary stream $b_{hv}$=($b_h$+$b_v$);
   S23. Hashing the merged binary stream $b_{hv}$ and obtaining a merged binary stream Hash value;
   S24. removing last eight bits of the merged binary stream Hash value, and performing a modular operation on the block height h to obtain the new Leader index;
   S25. determining that whether the proposal proposed by the node corresponding to the new Leader index is passed; if yes, implementing step S3, otherwise returning to step S21.

2. The method for weakening delays resulted from failures of multiple continuous nodes in a DBFT distributed network according to claim 1, wherein in the step S23, Hashing the merged binary stream $b_{hv}$ through a blake2b algorithm to obtain the merged binary stream Hash value as $hash_{hv}$=blake2b($b_{hv}$).

3. The method for weakening delays resulted from failures of multiple continuous nodes in a DBFT distributed network according to claim 2, wherein in the step S1, when the view index v=0, the new leader index is equal to the last leader index plus 1.

4. A non-transitory computer readable storage medium having stored thereon, a computer program executable by a processor for causing the processor to perform following steps:
- S1. determining that whether a view index is equal to zero; if yes, obtaining a new Leader index corresponding to a node according to a first rule and implementing step S3, otherwise implementing step S2;
- S2. calculating the new Leader index according to a second rule and determining whether a proposal proposed by the node corresponding to the new Leader index is passed; if yes, implementing step S3, otherwise repeatedly implementing step S2 until the proposal proposed by the node corresponding to the new Leader index is passed;
- S3. taking the node corresponding to the new Leader index as a new leader r;
- wherein in the step S1, the first rule is as follows: $p_h=(p_{h-1}+1)\% n$, wherein n refers to a node number, $p_h$ refers to the new Leader index, $p_{h-1}$ refers to a last Leader index;
- wherein the step S2 further comprises following steps:
  - S21. implementing a v++ operation for the view index v;
  - S22. converting a block height h and the view index v into a binary stream, respectively, and then merging the binary streams for obtaining a merged binary stream $b_{hv}=(b_h+b_v)$;
  - S23. Hashing the merged binary stream $b_{hv}$ and obtaining a merged binary stream Hash value;
  - S24. removing last eight bits of the merged binary stream Hash value, and performing a modular operation on the block height h to obtain the new Leader index;
  - S25. determining that whether the proposal proposed by the node corresponding to the new Leader index is passed; if yes, implementing step S3, otherwise returning to step S21.

5. The non-transitory computer readable storage medium according to claim 4, wherein in the step S23, Hashing the merged binary stream $b_{hv}$ through a blake2b algorithm to obtain the merged binary stream Hash value as $hash_{hv}=blake2b(b_{hv})$.

6. The non-transitory computer readable storage medium according to claim 5, in the step S1, when the view index v=0, the new leader index is equal to the last leader index plus 1.

7. A DBFT distributed network comprising multiple DBFT nodes, wherein the DBFT nodes have stored thereon, a computer program executable by the DBFT nodes for causing the DBFT nodes to perform following steps:
- S1. determining that whether a view index is equal to zero; if yes, obtaining a new Leader index corresponding to a node according to a first rule and implementing step S3, otherwise implementing step S2;
- S2. calculating the new Leader index according to a second rule and determining whether a proposal proposed by the node corresponding to the new Leader index is passed; if yes, implementing step S3, otherwise repeatedly implementing step S2 until the proposal proposed by the node corresponding to the new Leader index is passed;
- S3. taking the node corresponding to the new Leader index as a new leader;
- wherein in the step S1, the first rule is as follows: $p_h=(p_{h-1}+1)\% n$, wherein n refers to a node number, $p_h$ refers to the new Leader index, $p_{h-1}$ refers to a last Leader index;
- wherein the step S2 further comprises following steps:
  - S21. implementing a v++ operation for the view index v;
  - S22. converting a block height h and the view index v into a binary stream, respectively, and then merging the binary streams for obtaining a merged binary stream $b_{hv}=(b_h+b_v)$;
  - S23. Hashing the merged binary stream $b_{hv}$ and obtaining a merged binary stream Hash value;
  - S24. removing last eight bits of the merged binary stream Hash value, and performing a modular operation on the block height h to obtain the new Leader index;
  - S25. determining that whether the proposal proposed by the node corresponding to the new Leader index is passed; if yes, implementing step S3, otherwise returning to step S21.

8. The DBFT distributed network according to claim 7, wherein in the step S23, Hashing the merged binary stream $b_{hv}$ through a blake2b algorithm to obtain the merged binary stream Hash value as $hash_{hv}=blake2b(b_{hv})$.

9. The DBFT distributed network according to claim 8, wherein in the step S1, when the view index v=0, the new leader index is equal to the last leader index plus 1.

* * * * *